(12) United States Patent
Lu et al.

(10) Patent No.: US 12,104,508 B1
(45) Date of Patent: Oct. 1, 2024

(54) LARGE-SIZE DIESEL EXHAUST VALVE AND MANUFACTURING METHOD THEREOF

(71) Applicant: COSCO SHIPPING MARINE EQUIPT & SPARES (NJ) CO., LTD, Jiangsu (CN)

(72) Inventors: Hong Lu, Nanjing (CN); Weiwei Dai, Nanjing (CN); Lihe Jiang, Nanjing (CN); Guozheng Quan, Chongqing (CN); Xiaolin Zhang, Nanjing (CN)

(73) Assignee: Cosco Shipping Marine Equipt & Spares (NJ) Co., Ltd., Nanjing (CN)

( * ) Notice: Subject to any disclaimer, the term of this patent is extended or adjusted under 35 U.S.C. 154(b) by 0 days.

(21) Appl. No.: 18/710,730

(22) PCT Filed: Nov. 15, 2022

(86) PCT No.: PCT/CN2022/131933
§ 371 (c)(1),
(2) Date: May 16, 2024

(87) PCT Pub. No.: WO2023/088237
PCT Pub. Date: May 25, 2023

(30) Foreign Application Priority Data

Nov. 16, 2021 (CN) .......................... 202111356334.9

(51) Int. Cl.
*C22C 19/05* (2006.01)
*B21J 5/02* (2006.01)
(Continued)

(52) U.S. Cl.
CPC . *F01L 3/02* (2013.01); *B21J 5/02* (2013.01); *C22C 19/058* (2013.01); *C22F 1/10* (2013.01)

(58) Field of Classification Search
CPC ... C22C 19/058; C22C 19/052; C22C 19/053; C22F 1/10
See application file for complete search history.

(56) References Cited

FOREIGN PATENT DOCUMENTS

| CN | 101429608 A | 5/2009 |
|---|---|---|
| CN | 102605214 A | 7/2012 |

(Continued)

OTHER PUBLICATIONS

PCT International Search Report with English Translation, Int. Application No. PCT/CN2022/131933, Int. Filing Date: Nov. 15, 2022, Dated: Jan. 30, 2023.

(Continued)

*Primary Examiner* — Jessee R Roe
(74) *Attorney, Agent, or Firm* — Reising Ethington P.C.

(57) ABSTRACT

Provided are a large-size diesel exhaust valve and a manufacturing method thereof, which relate to the technical field of manufacturing of large-size diesel exhaust valves for ships. The large-size diesel exhaust valve includes an exhaust valve disc portion made of a 3J40 alloy, and the large-size diesel exhaust valve has the following microstructure: there are ultra-fine grains with a grain size of 10 grade or more, α-Cr lamellar phases are evenly distributed at grain boundaries of the ultra-fine grains, nickel-lean Cr—Al—Ce particle phases are evenly distributed in a matrix, a single lamella of the α-Cr lamellar phases has a thickness of less than 140 nm, and the nickel-lean Cr—Al—Ce particle phases have a diameter of less than 10 μm. The present application solves the technical problem of how to improve the comprehensive mechanical properties and the vibration-damping performance of a large-size diesel exhaust valve simultaneously.

9 Claims, 13 Drawing Sheets

(51) Int. Cl.
*C22F 1/10* (2006.01)
*F01L 3/02* (2006.01)

(56) References Cited

FOREIGN PATENT DOCUMENTS

| | | |
|---|---|---|
| CN | 108193142 A | 6/2018 |
| CN | 111519070 A | 8/2020 |
| CN | 113528895 A | 10/2021 |
| CN | 114015909 A | 2/2022 |
| KR | 101850966 B1 | 4/2018 |

OTHER PUBLICATIONS

Chinese 1st Office Action and English Translation, CN Application No. 202111356334.9, Applicant: Nanjing Middle Far Marine Vessel Equipment Accessories, Dated: Feb. 23, 2022.
Chinese Notification to Grant Patent Right for Invention and English Translation, CN Application No. 202111356334.9, Applicant: Nanjing Middle Far Marine Vessel Equipment Accessories, Dated: Apr. 13, 2022.

LARGE-SIZE DIESEL EXHAUST VALVE AND MANUFACTURING METHOD THEREOF

CROSS REFERENCE TO RELATED APPLICATION

The present application is a national stage application of International Patent Application No. PCT/CN/2022/131933, filed on Nov. 15, 2022, which claims priority to the Chinese Patent Application CN202111356334.9 filed to the China National Intellectual Property Administration (CNIPA) on Nov. 16, 2021 and entitled "LARGE-SIZE DIESEL EXHAUST VALVE AND MANUFACTURING METHOD THEREOF", which is incorporated herein by reference in its entirety.

TECHNICAL FIELD

The present disclosure relates to the technical field of manufacturing of large-size exhaust valves for ships, and in particular to a large-size diesel exhaust valve and a manufacturing method thereof.

BACKGROUND

A large prime mover is a heart of a large ship, and thus the superior performance of the large prime mover is the key to allowing an excellent transportation capacity of the large ship. A low-speed diesel exhaust valve (a large-size diesel exhaust valve) is a key component for the air inlet/outlet of a combustion chamber of a large diesel engine, and thus the performance of the low-speed diesel exhaust valve seriously affects the reliability, power, and service life of the large diesel engine. During a working process of a diesel engine, a high-temperature gas produces a great bursting pressure and carries strongly-corrosive substances, and alternating loads applied by an exhaust valve spring and various moving components make an exhaust valve stay in a high-temperature, impacting, abrasive, and corrosive harsh environment for a long time, which can easily make the exhaust valve damaged due to failures such as breakage and wearing in service. Therefore, materials for exhaust valves are required to have wear resistance, high strength and toughness, high impact resistance, and mechanical vibration resistance.

Large-size exhaust valves can be formed through hot forging or electric upsetting. Due to the limitation of an upsetting ratio, a hot forging process requires multiple times of forging to reach a corresponding specification. An electric upsetting process can reach a corresponding specification through one-time material accumulation. Multiple times of hot forging not only lead to a low efficiency, but also make products have poor consistency. However, both the hot forging and electric upsetting processes require a long-time high-temperature treatment, which causes the grain coarsening problem.

In addition, the larger the size of an exhaust valve, the more uneven the field quantity distribution, resulting in an uneven grain distribution. A strong alternating vibration brought by a mechanical device will aggravate the wearing of an exhaust valve and even cause the fatigue of a structure to cause the early damage.

Currently, the well-known material with high-temperature and corrosion resistance for exhaust valves is the Nimonic80A nickel-base superalloy material (Cr: 20.87%, Fe: 1.26%, Al: 0.68%, Mn: 0.63%, Ti: 2.07%, Si: 0.55%, C: 0.069%, and Ni: the balance). The Nimonic80A nickel-base superalloy material has reached or even no longer meets a specified thermal load of an exhaust valve in an exhaust system of a high-efficiency diesel-powered low-speed engine for a ship, and the toughness of the Nimonic80A nickel-base superalloy material cannot be well adapted to strong alternating vibration scenarios.

There is an urgent need to find an alternative exhaust valve material or a manufacturing process for improving an exhaust valve to meet the increasing wear resistance, strength and toughness, impact resistance, and mechanical vibration resistance of large-size exhaust valves, thereby ensuring the high thermal efficiency and durability of large prime movers.

SUMMARY

In view of the deficiencies in the art, the present disclosure provides a large-size diesel exhaust valve to improve the comprehensive mechanical properties and vibration-damping performance.

In order to solve the above-mentioned technical problem, the present disclosure adopts the following technical solutions: The present disclosure provides a large-size diesel exhaust valve, including an exhaust valve disc portion made of a 3J40 alloy, where the large-size diesel exhaust valve has the following microstructure: there are ultra-fine grains with a grain size of 10 grade or more, α-Cr lamellar phases are evenly distributed at grain boundaries of the ultra-fine grains, nickel-lean Cr—Al—Ce particle phases are evenly distributed in a matrix, a single lamella of the α-Cr lamellar phases has a thickness of less than 140 nm, and the nickel-lean Cr—Al—Ce particle phases have a diameter of no more than 10 μm.

Preferably, the 3J40 alloy includes the following essential elements in mass percentages: Cr: 39% to 41%, Al: 3.3% to 3.5%, Fe: less than or equal to 0.5%, Ce: 0.1% to 0.2%, Si: less than or equal to 0.2%, Mn: less than or equal to 0.10%, S: less than or equal to 0.010%, P: less than or equal to 0.010%, C: less than or equal to 0.03%, and Ni: the balance.

Preferably, the 3J40 alloy includes the following essential elements in mass percentages: Cr: 39.2%, Al: 3.32%, Fe: 0.12%, Ce: 0.2%, Si: 0.03%, Mn: 0.10%, S: 0.010%, P: 0.0033%, C: 0.018%, and Ni: the balance.

Preferably, the 3J40 alloy includes the following essential elements in mass percentages: Cr: 39.56%, Al: 3.39%, Fe: 0.14%, Ce: 0.12%, Si: 0.061%, Mn: 0.010%, S: 0.003%, P: 0.006%, C: 0.022%, and Ni: the balance.

Preferably, the 3J40 alloy includes the following essential elements in mass percentages: Cr: 39.23%, Al: 3.35%, Fe: 0.26%, Ce: 0.15%, Si: 0.061%, Mn: 0.010%, S: 0.002%, P: 0.005%, C: 0.015%, and Ni: the balance.

The present disclosure also provides a manufacturing method of a large-size diesel exhaust valve, including the following steps:

pretreatment: subjecting a 3J40 alloy bar to a solution treatment at 1,000° C. to 1,050° C. for 50 min to 70 min to obtain a first intermediate material, and oil-cooling the first intermediate material to obtain a second intermediate material, where a thickness of a single lamella of a α-Cr lamellar phase is controlled at less than 150 nm and a diameter of a nickel-lean Cr—Al—Ce particle phase is controlled at no more than 10 μm;

electric upsetting process: forming the second intermediate material through electric upsetting at a low strain rate to obtain a first billet, where throughout the electric upsetting process, an electric upsetting temperature is controlled at 1,150° C. to 950° C. and an electric upsetting strain rate is controlled at 0 $s^{-1}$ to 0.05 $s^{-1}$;

supplemental heating treatment: conducting supplemental heating on a head of the first billet at 1,000° C. to 1,050° C. for 20 min to 25 min to obtain a second billet;

heat preservation treatment: holding the second billet at 1,000° C. to 1,050° C. for 20 min to 25 min to obtain a third billet, where a total time of a supplemental heating time and a heat preservation time is 45 min or less;

die forging process: forging the third billet at one time to produce a first initial exhaust valve with a disc portion and a rod portion, where the third billet processed into the first initial exhaust valve is a bar; and the rod portion of the first initial exhaust valve does not need to be processed additionally, and only the disc portion of the first initial exhaust valve needs to be partially forged; and post-treatment: subjecting the first initial exhaust valve to an aging treatment at 770° C. to 790° C. for 16 h to 18 h to obtain a second initial exhaust valve, and air-cooling the second initial exhaust valve, where the thickness of the single lamella of the α-Cr lamellar phase is controlled at less than 140 nm and the diameter of the nickel-lean Cr—Al—Ce particle phase is controlled at no more than 10 μm.

Preferably, the aging treatment is conducted at 770° C., 780° C., or 790° C.

Preferably, the solution treatment in the pretreatment is conducted at 1,020° C. for 60 min.

Preferably, the supplemental heating treatment is conducted at 1,020° C. for 20 min; and the heat preservation treatment is conducted at 1,050° C. for 25 min.

Compared with the prior art, the present disclosure has the following beneficial effects:

1. The 3J40 alloy is a high-hardness and high-elasticity nickel-based alloy, which has excellent characteristics such as high hardness, corrosion resistance, and non-magnetism. However, because parameters of hot working for the 3J40 alloy are in very narrow ranges, the 3J40 alloy is generally manufactured through cold working, and the 3J40 alloy is often used to manufacture pivots of instruments and pivots of small shafts. Currently, there is no example of using the 3J40 alloy to manufacture a large-size diesel exhaust valve. In the present disclosure, the 3J40 alloy is used for the first time in a large-size diesel exhaust valve, and an unexpected effect is made. The present disclosure overcomes the problem that the existing electric upsetting process causes coarse grains, and can lead to ultra-fine grains with a grain size of 10 grade or more. The present disclosure not only retains the excellent characteristics such as high hardness, corrosion resistance, and non-magnetism of the 3J40 alloy, but also improves the toughness. Therefore, the comprehensive mechanical properties and vibration-damping performance of an exhaust valve prepared by the present disclosure can be improved.

2. In the prior art, a α-Cr strengthening phase is used to improve a hardness of a 3J40 alloy component, but a α-Cr lamellar phase will increase the brittleness of a material, that is, the impact resistance will decrease, especially when a volume fraction of the α-Cr strengthening phase is greater than 15%.

In the present disclosure, both a α-Cr lamellar phase (a single lamella has a thickness of less than 140 nm) and a nickel-lean Cr—Al—Ce particle phase (which is mainly spherical and has a diameter of no more than 10 μm) are used as a second phase, and have special morphologies. The α-Cr lamellar phase plays a role of inhibiting the growth of grains. The nickel-lean Cr—Al—Ce particle phase can not only improve the impact toughness and reduction of area, but also inhibit the growth of grains to allow grain refinement.

3. In the present disclosure, the 3J40 alloy is subjected to a solution treatment at a specific temperature (1,000° C. to 1,050° C.), and the α-Cr lamellar phase and the nickel-lean Cr—Al—Ce particle phase in the alloy undergo an incomplete solution, such that the α-Cr lamellar phase and the nickel-lean Cr—Al—Ce particle phase are refined. The fine lamellar precipitated phases distributed at grain boundaries of austenite grains and the particle precipitated phases distributed on a matrix promote the static recrystallization for nucleation and block the grain growth caused by the migration of grain boundaries of static recrystallization during a solution process, such that grains of a bar material are refined. In addition, the rare earth element Ce in the 3J40 alloy and inclusions produced thereby are diffusely distributed after full diffusion. On the one hand, when the Ce element is dissolved in a matrix in a solid form, it will cause a strong lattice distortion to produce a spherical symmetrical stress field, thereby strengthening an alloy. On the other hand, during a static recrystallization process, high-melting-point cerium oxide or cerium oxysulfide inclusions produced from Ce, as heterogeneous nucleation cores, undergo segregation at grain boundaries to hinder the growth of grains, which can also allow the effect of grain refinement. The above conditions make the subsequent hot working possible.

4. During an electric upsetting process, an electric upsetting temperature is always controlled at 1,150° C. to 950° C., and with the development of plastic deformation, the diffusity of the distribution of the α-Cr lamellar phase and the nickel-lean Cr—Al—Ce particle phase increases. The ultra-fine lamellar phase and particle phase diffusely distributed in this way are conducive to the energy storage at grain boundaries to allow dynamic recrystallization for nucleation, and can inhibit the grain growth caused by the migration of grain boundaries during the electric upsetting process. Nevertheless, final grain sizes of the α-Cr lamellar phase and the nickel-lean Cr—Al—Ce particle phase after the electric upsetting process increase to some extent compared with those before the electric upsetting process, which is mainly due to the fact that the material is at a high temperature for a long time during the electric upsetting process. However, this increase is very small compared with a material without the ultra-fine lamellar phase and particle phase.

5. In supplemental heating and heat preservation processes, the inhomogeneity of a microstructure and the segregation of elements caused by a volume effect of the electric upsetting process are alleviated to some extent, and the lamellar phase and particle phase undergo an incomplete solution once again, which makes the α-Cr lamellar phase and the nickel-lean Cr—Al—Ce particle phase further refined.

6. During a die forging process, a billet produced after the heat preservation treatment is forged at one time to produce an exhaust valve with a disc portion and a rod portion. During the die forging process, the fine α-Cr lamellar phase and nickel-lean Cr—Al—Ce particle phase produced after the supplemental heating and heat preservation hinder the grain boundary sliding and allow the energy storage to promote the dynamic recrystallization for nucleation, and inhibit the growth of grains.

7. During a post-treatment process, a 3J40 alloy produced after the die forging is subjected to an aging treatment at a specific temperature (770° C. to 790° C.), and ultra-fine lamellar phases and particle phases are mainly precipitated. The fine lamellar phases and particle phases left before the post-treatment and the ultra-fine lamellar phases and particle phases newly produced after the aging treatment gradually tend to be homogenized under the conditions of the aging treatment. In addition, under the conditions of the aging treatment, the uneven grain distribution and even sub-grains caused by volume effects in the previous electric upsetting and die forging processes will be gradually homogenized and stabilized. Grain sizes of a disc portion and a rod portion of a final exhaust valve reach 10 grade or more, a single lamella of a α-Cr lamellar strengthening phase produced has a thickness of less than 140 nm (an ultra-fine characteristic), and a nickel-lean Cr—Al—Ce particle phase diffusely distributed in a matrix has a diameter of no more than 10 μm. The above characteristics ultimately improve the hardness, strength and toughness, vibration-damping performance, and impact resistance of a component.

8. The present disclosure unearths the special properties of the 3J40 alloy: Under specific conditions (the pre-treatment and post-treatment), special second phases (fine α-Cr lamellar phases and nickel-lean Cr—Al—Ce particle phases) can be precipitated, and the second phases are allowed to play a role of grain refinement, instead of serving as impurities that need to be inhibited as in the prior art. In combination with the electric upsetting-forging process and the post-treatment, a large-size diesel exhaust valve finally manufactured has ultra-fine grains that are at 10 grade or more and are evenly distributed. Because the uniform refinement of grains overcomes the contradiction that the alloy has a high strength and a low toughness in the prior art, the mechanical properties (hardness and strength) and vibration-damping performance (mainly reflected by a product of strength and elongation index) all are improved.

DETAILED DESCRIPTION OF THE EMBODIMENTS

Example 1

A 3J40 alloy in this example includes the following essential elements in mass percentages: Cr: 39.2%, Al: 3.32%, Fe: 0.12%, Ce: 0.2%, Si: 0.03%, Mn: 0.10%, S: 0.010%, P: 0.0033%, C: 0.018%, and Ni: the balance.

Figure 1:
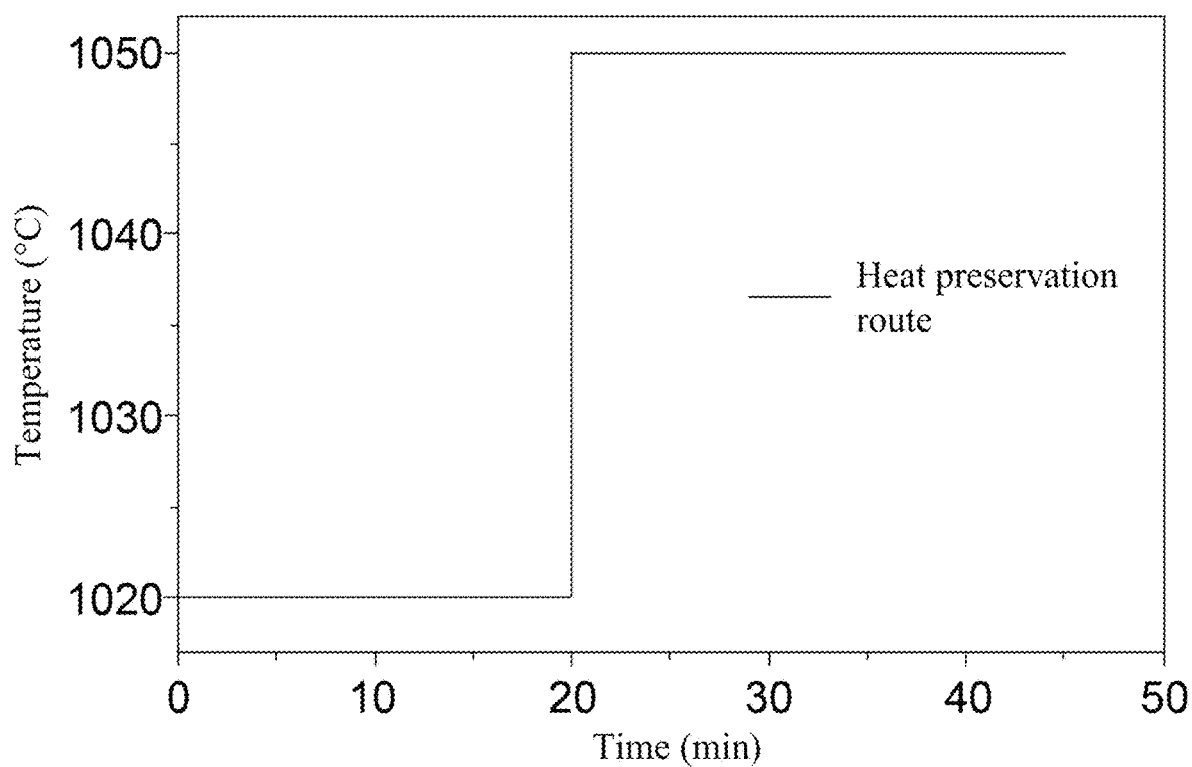
FIG. 1 is a schematic diagram of a specific heat preservation route.

A diesel exhaust valve with a rod portion diameter of 67 mm, a total length of 1,230 mm, and a disc portion diameter of 327 mm was manufactured. The 3J40 alloy was manufactured into a first bar material with a length of 2,560 mm for electric upsetting. The 67 mm first bar material was subjected to a solution treatment at 1,020° C. for 60 min and then oil-cooled to obtain a second bar material. During the solution treatment process, the static recrystallization occurs because the α-Cr lamellar phase and the nickel-lean Cr—Al—Ce particle phase undergoing an incomplete solution block the grain growth caused by the migration of grain boundaries of the static recrystallization and Ce inclusions undergo segregation at grain boundaries to provide a heterogeneous nucleation core. The second bar material produced after the solution treatment was subjected to electric upsetting to obtain a first billet. An accumulated material volume for electric upsetting was calculated according to a volume of the disc portion of the exhaust valve, parameters for the electric upsetting process were designed with reference to the patent CN202010531963.X, and a high-order segmented dynamic loading mode was adopted. Throughout the electric upsetting process, because the 3J40 alloy had high sensitivity to temperatures, an electric upsetting strain rate was controlled at 0 s$^{-1}$ to 0.05 s$^{-1}$ and an electric upsetting temperature was controlled at 1,150° C. to 950° C. After material accumulation, a garlic head portion had a total length of 390 mm. The electric upsetting temperature was controlled at 1,150° C. to 950° C. throughout the electric upsetting process. The first billet was immediately subjected to a heat preservation treatment at 1,020° C. for 20 min and at 1,050° C. for 25 min to obtain a second billet. The heat preservation temperature and time were designed according to the characteristics of the material and the temperature of the process. During the supplemental heating and heat preservation processes, the static recrystallization occurs, such that coarse grains caused by long-term material accumulation for electric upsetting are refined and a garlic head portion of an electric upsetting material has a uniform temperature, which is conducive to the subsequent die forging. FIG. 1 is a schematic diagram of a specific heat preservation route. The second billet was subjected to die forging by a hydraulic press with a pressure set at 6,950 T to obtain an initial exhaust valve. The entire initial exhaust valve was subjected to an aging treatment at 770° C. for 18 h and then air-cooled. During the aging treatment process, the static recrystallization occurs, and a α-Cr phase with a single lamella thickness of 140 nm or less and a nickel-lean Cr—Al—Ce particle phase are re-precipitated. The undissolved phases before the post-treatment and the newly-produced phases after the aging treatment block the grain growth caused by the migration of grain boundaries of static recrystallization, and under the conditions of the aging treatment, the uneven grain distribution and even subgrains caused by volume effects in the previous electric upsetting and die forging processes will be gradually homogenized and stabilized. Therefore, the grains of the disc portion of the exhaust valve are refined to 10 grade or more.

Figure 2:
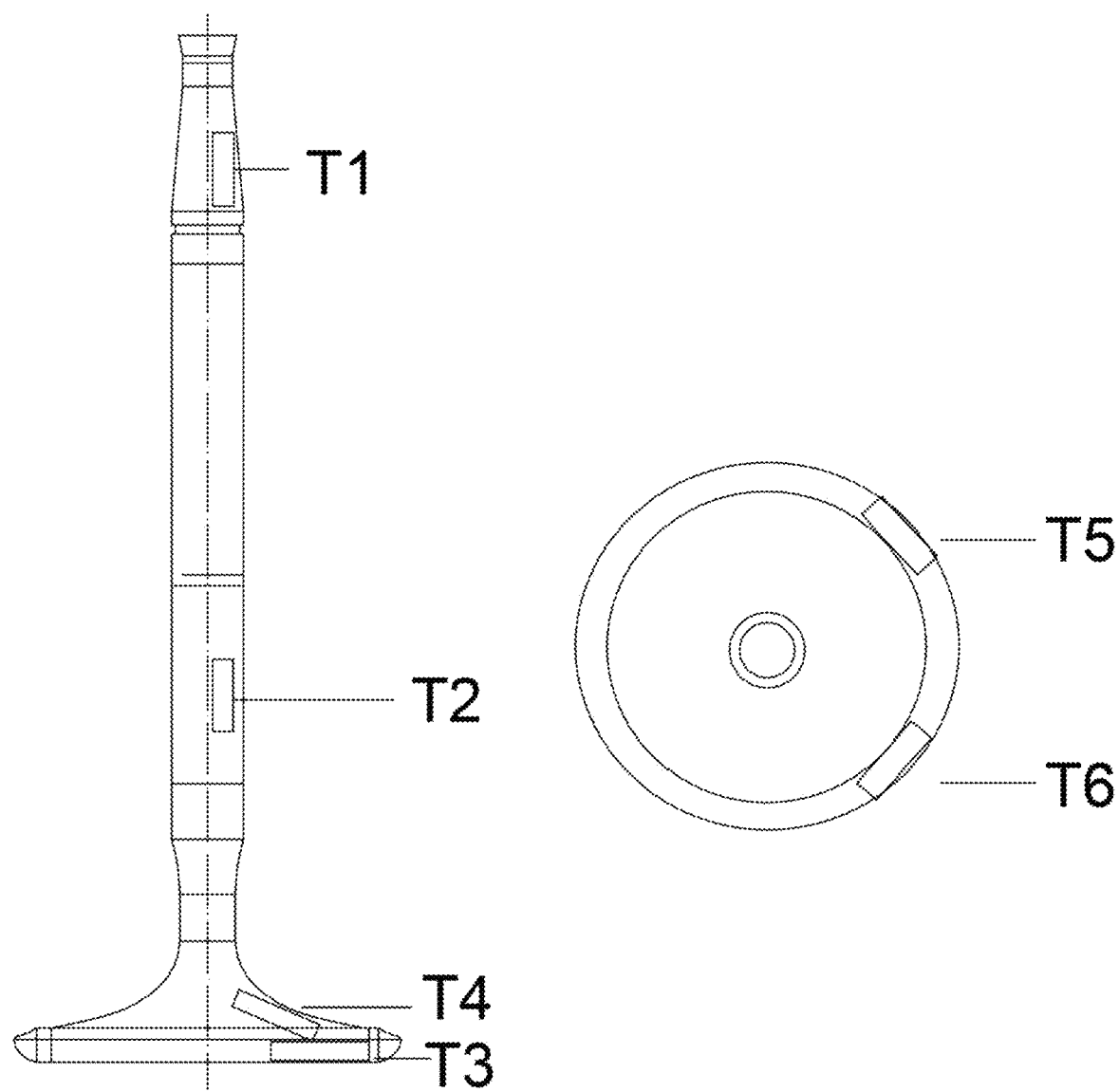
FIG. 2 shows sampling positions of an exhaust valve formed.

The formed exhaust valve was sampled for analysis. As shown in the sampling position diagram of FIG. 2, a sample was collected at six positions of the exhaust valve for a series of mechanical performance tests. Table 3 shows results of the series of mechanical performance tests. The exhaust valve has a tensile strength of 1,364 MPa to 1,436 MPa and a yield strength of 1,110 MPa to 1,165 MPa. Even at the weakest T3 position in a bottom of the disc portion, the exhaust valve has a tensile strength of 1,364 Mpa, a yield strength of 1,110 Mpa, an elongation of 21%, and a reduction of area of 39%. The overall mechanical properties of the exhaust valve are uniform, where tensile strengths all are 1,350 MPa or more and a difference between a maximum tensile strength and a minimum tensile strength is no more than 100 MPa. The exhaust valve has a prominent reduction of area, indicating excellent toughness. A product of strength and elongation is a comprehensive performance index to characterize a strength and toughness level of a metal material. The product of strength and elongation is expressed by a product of a tensile strength and an elongation at break (namely, elongation) of a material. A product of strength and elongation index of an exhaust valve can be calculated to evaluate the balanced strength and toughness of the exhaust valve of the present disclosure. An exhaust valve made of a Nimonic80A alloy generally has a 0.2% yield stress of 800 MPa or more, a tensile strength of 1,200 MPa, a reduction of area of 30%, and a product of strength and elongation index of 180. The overall mechanical properties of the Nimonic80A alloy exhaust valve are weaker than the overall mechanical properties of the 3J40 alloy exhaust valve. The present disclosure allows the comprehensive mechanical properties of a 3J40 alloy exhaust valve to be better than the comprehensive mechanical properties of a Nimonic80A alloy exhaust valve.

TABLE 1

|  | Tensile strength, Rm/ MPa | 0.2% yield strength, Rp0.2/ MPa | Elongation, A % | Reduction of area, Z % | Product of strength and elongation |
| --- | --- | --- | --- | --- | --- |
| T1 | 1436 | 1148 | 17 | 41 | 244.12 |
| T2 | 1389 | 1112 | 18 | 41 | 250.02 |
| T3 | 1364 | 1110 | 21 | 39 | 286.44 |
| T4 | 1369 | 1124 | 22 | 42 | 301.18 |
| T5 | 1423 | 1165 | 18 | 36 | 256.14 |
| T6 | 1401 | 1145 | 19 | 39 | 266.19 |
| Nimonic80A | 1200 | 800 | 15 | 30 | 180 |

Each sample was subjected to an impact test, where an impact standard referred to GB/T229 and a test sample had a size of 10 mm*10 mm*55 mm and was U-shaped. Table 2 below shows specific impact energy values measured. Compared with the existing exhaust valves, the impact toughness of the 3J40 alloy exhaust valve is greatly improved and the brittleness tendency of the 3J40 alloy exhaust valve is reduced.

TABLE 2

| Impact Test | J |
| --- | --- |
| 3J40 | 20-29 |

The surface hardness of the exhaust valve was tested. Table 3 shows the hardness comparison between the 3J40 alloy exhaust valve and the Nimonic80A alloy exhaust valve. It can be seen that the overall hardness values of the 3J40 alloy exhaust valve are in a range of 415 HV to 425 HV, and a minimum hardness value of a bottom surface of the exhaust valve is also 415 HV, which is also better than that of the Nimonic80A alloy exhaust valve. The high surface hardness values of the exhaust valve indicate excellent surface wear resistance.

TABLE 3

| | Seat hardness | | | |
| --- | --- | --- | --- | --- |
| Hardness | Average @seat surface | Average @1 mm depth HV20 | Average @8 mm depth HV20 | Valve stem |
| 3J40 | 415 | 422 | 425 | 424 |
| Nimonic80A | 380 | | | |

Figure 3:
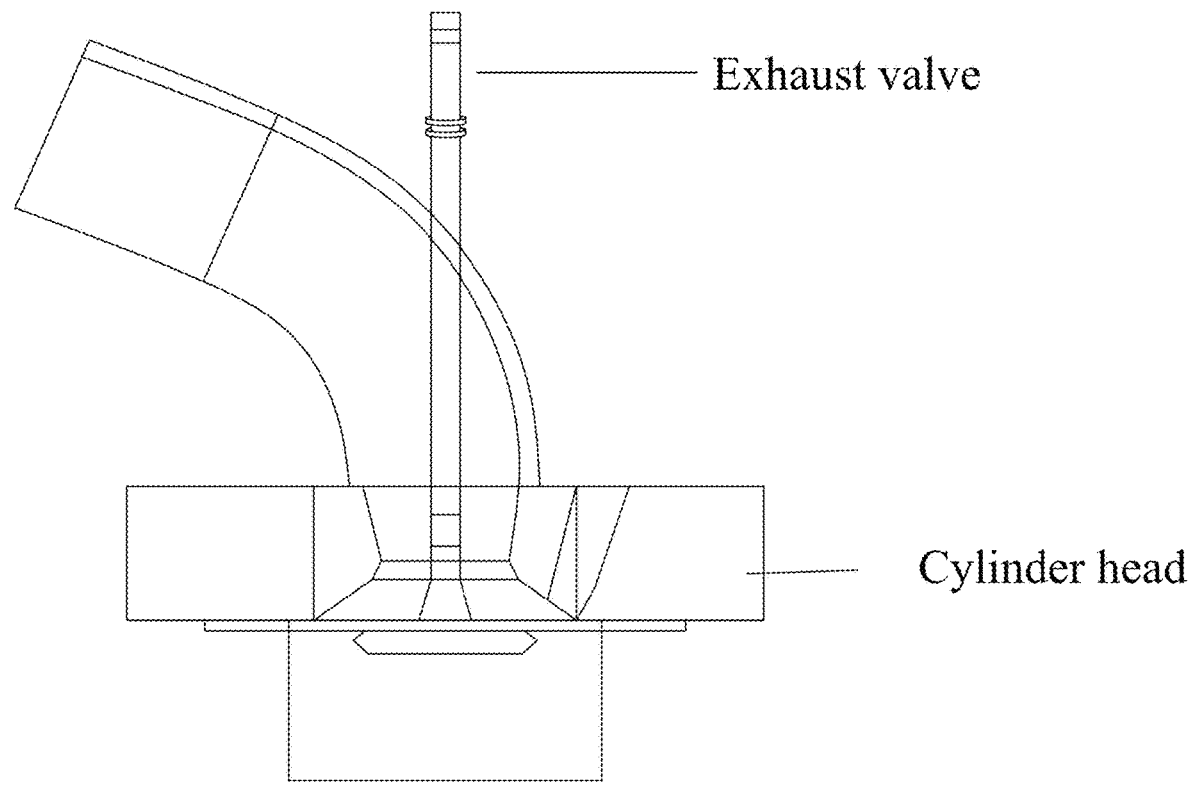
FIG. 3 shows a vibration model established for testing the vibration-damping performance.
Figure 4:
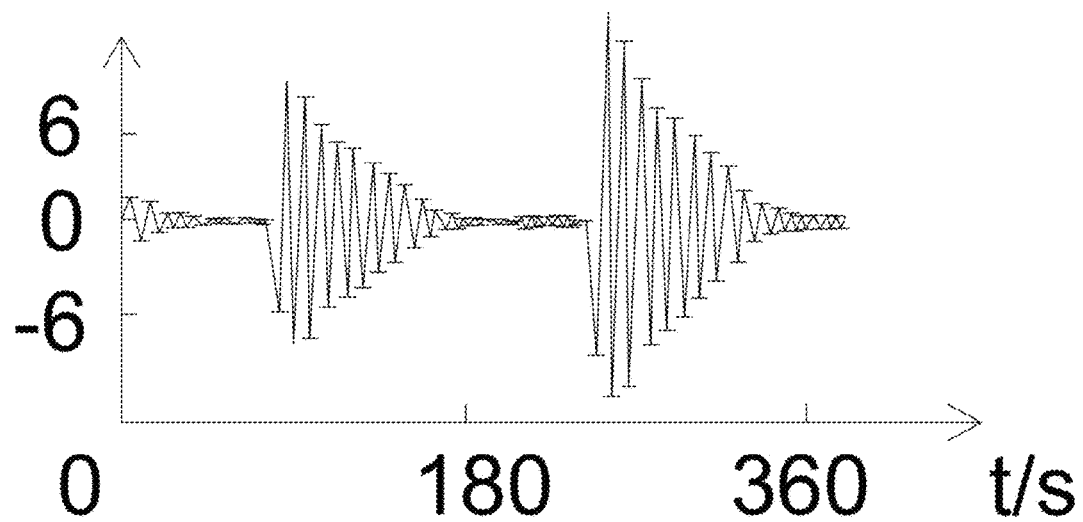
FIG. 4 shows a vibration signal simulated by a Nimonic80A alloy.
Figure 5:
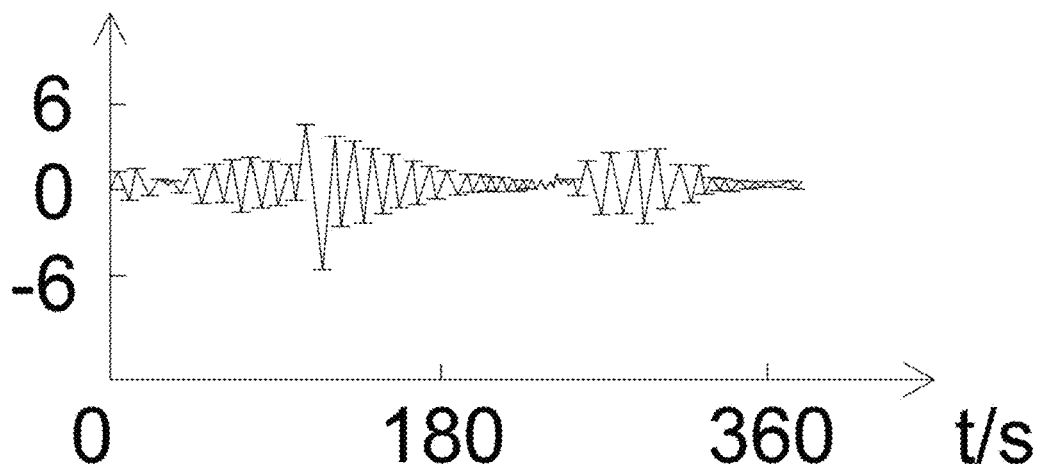
FIG. 5 shows a vibration signal simulated by a 3J40 alloy.

Based on the comparison of tensile strength and impact toughness values between the above materials, it can be known that the 3J40 material has better strength and toughness than the Nimonic80A material. Under different material parameters, a vibration model for an exhaust valve and a cylinder head of a prime mover were established on the ANSYS software. Material parameters were assigned to the vibration model for the exhaust valve to allow vibration simulation for each of the 3J40 alloy and Nimonic80A alloy exhaust valves, and vibration signals were acquired. FIG. 3 shows the vibration model established, FIG. 4 shows a vibration signal simulated by the Nimonic80A alloy, and FIG. 5 shows a vibration signal simulated by the 3J40 alloy. It can be seen from the comparison between FIG. 4 and FIG. 5 that the vibration and noise of the exhaust valve are affected by the different material parameters, and the 3J40 alloy exhaust valve has a better vibration-damping effect than the Nimonic80A alloy exhaust valve.

Example 2

The 3J40 alloy in Example 2 includes the following essential elements in mass percentages: Cr: 39.56%, Al: 3.39%, Fe: 0.14%, Ce: 0.12%, Si: 0.061%, Mn: 0.010%, S: 0.003%, P: 0.006%, C: 0.022%, and Ni: the balance.

Figure 6:
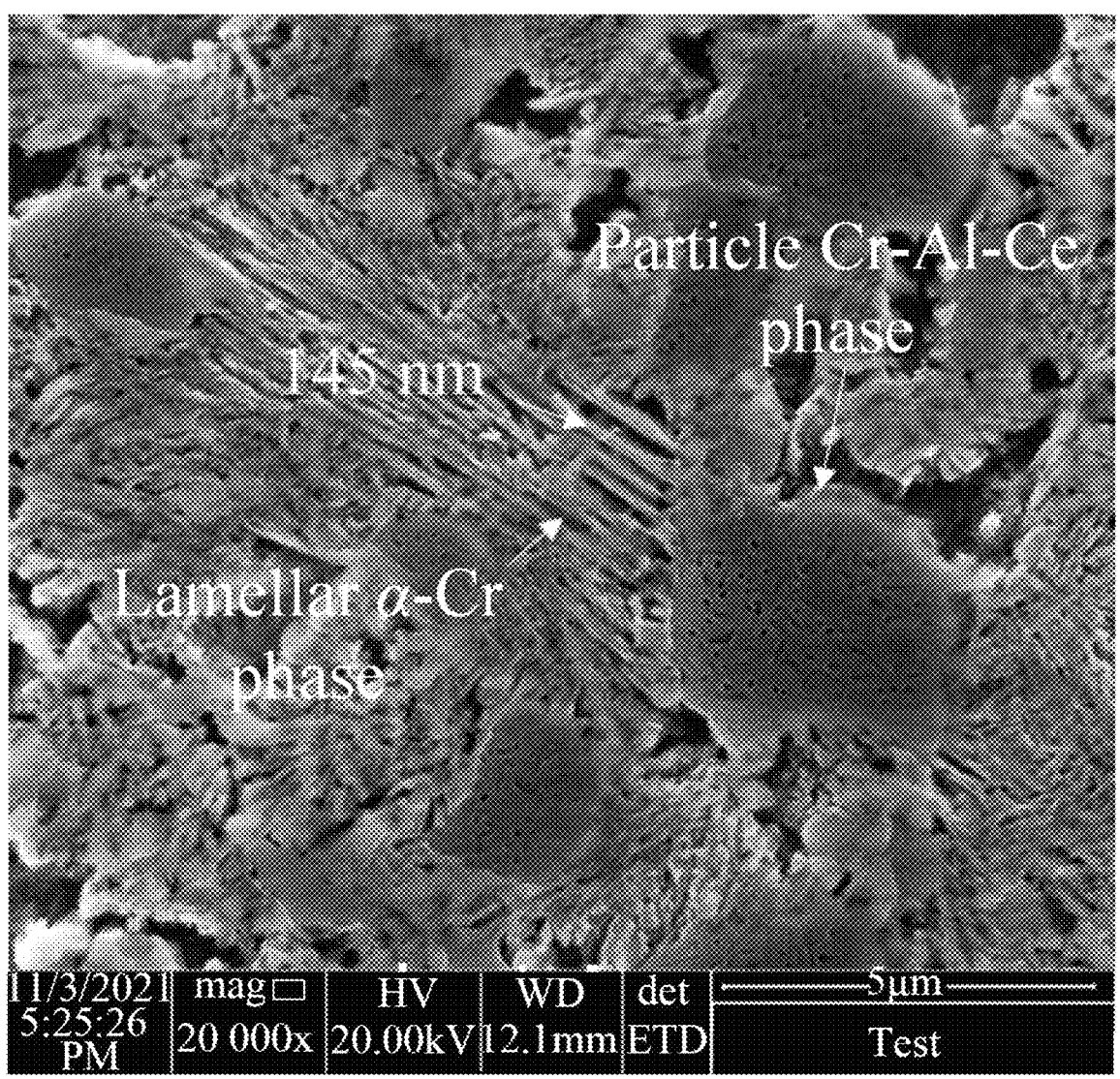
FIG. 6 is a 20,000× scanning image of a material produced after a first solution treatment.
Figure 7:
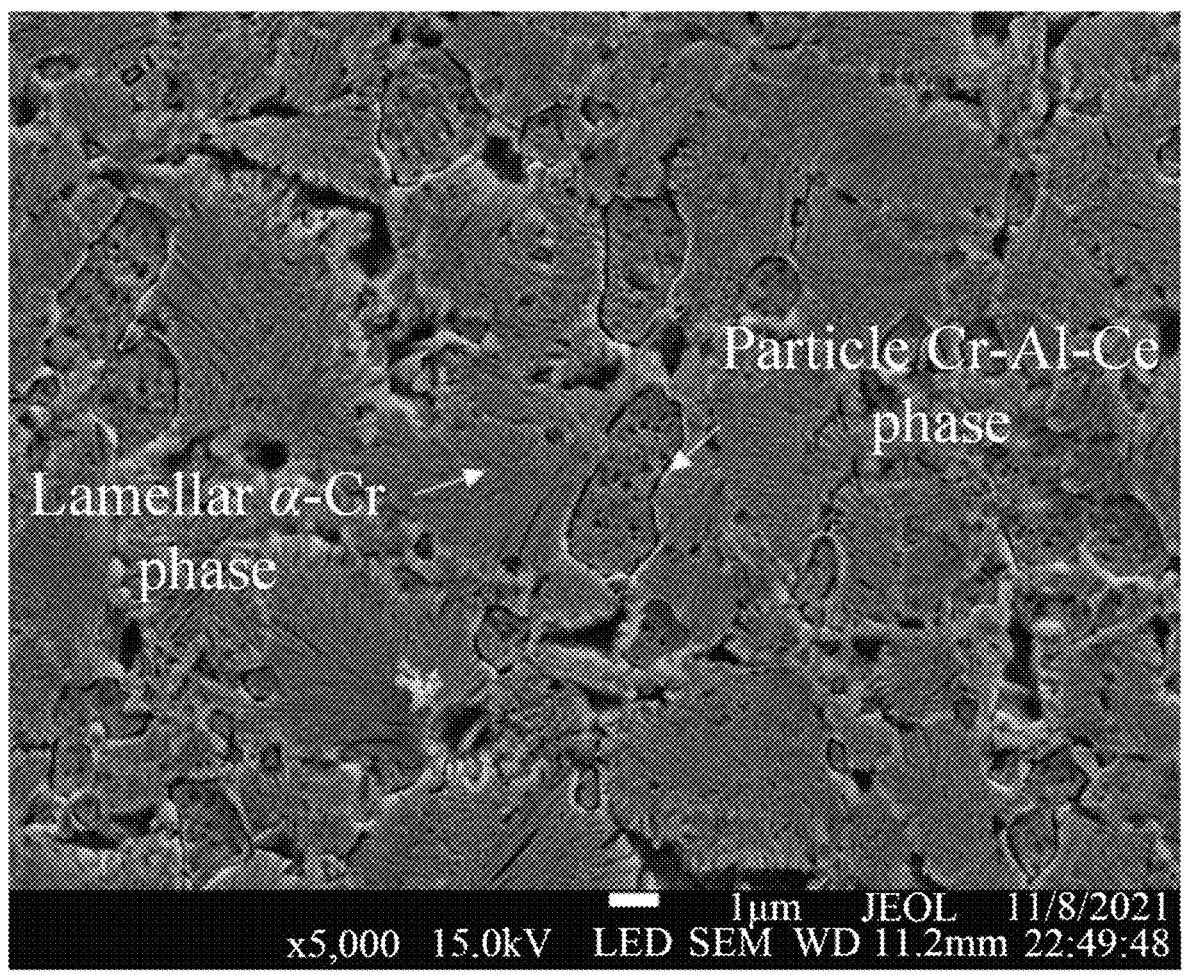
FIG. 7 is a 5,000× scanning image of a material of a valve face of an exhaust valve.
Figure 8:
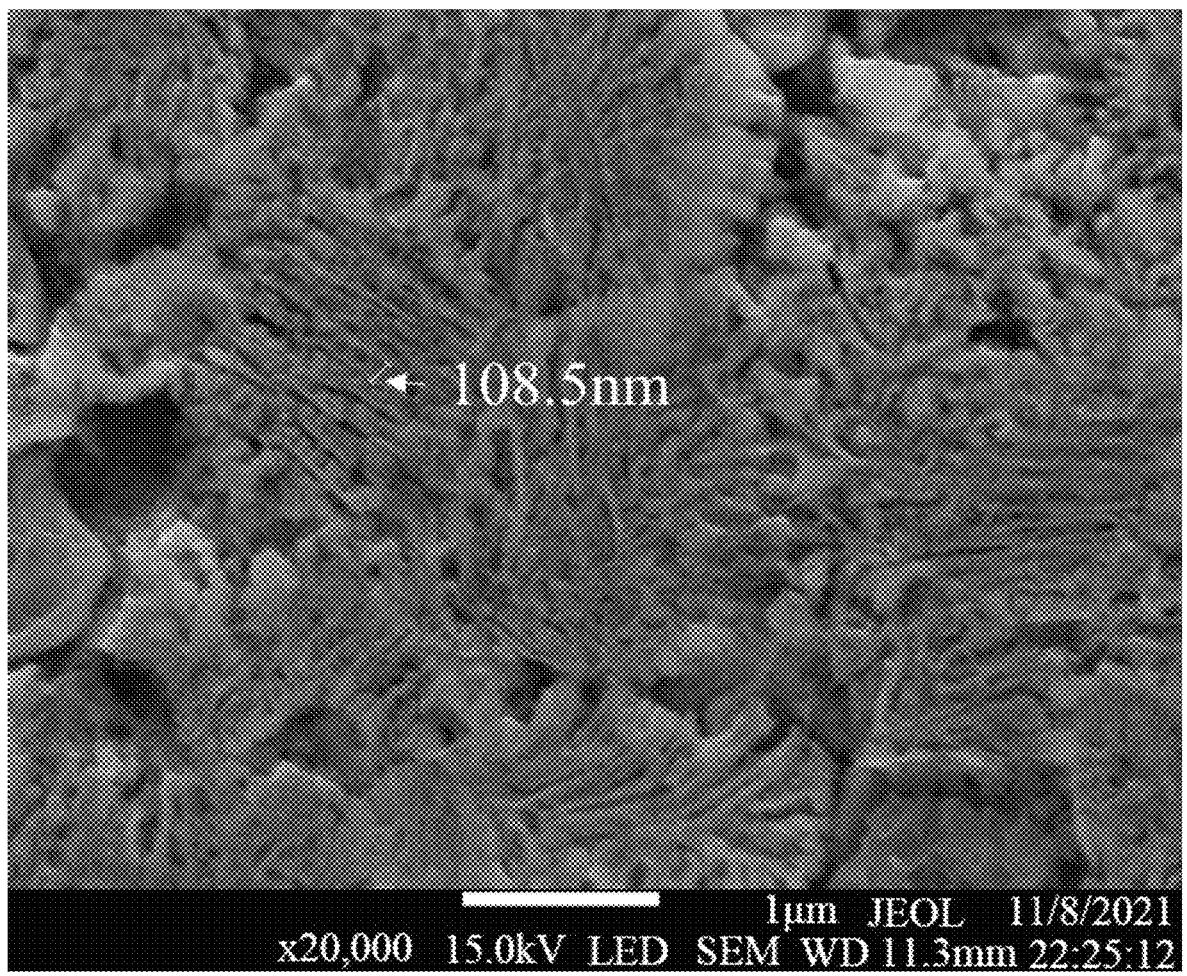
FIG. 8 shows a size of a α-Cr phase of a material of a valve face of an exhaust valve measured at 20,000×.
Figure 9:
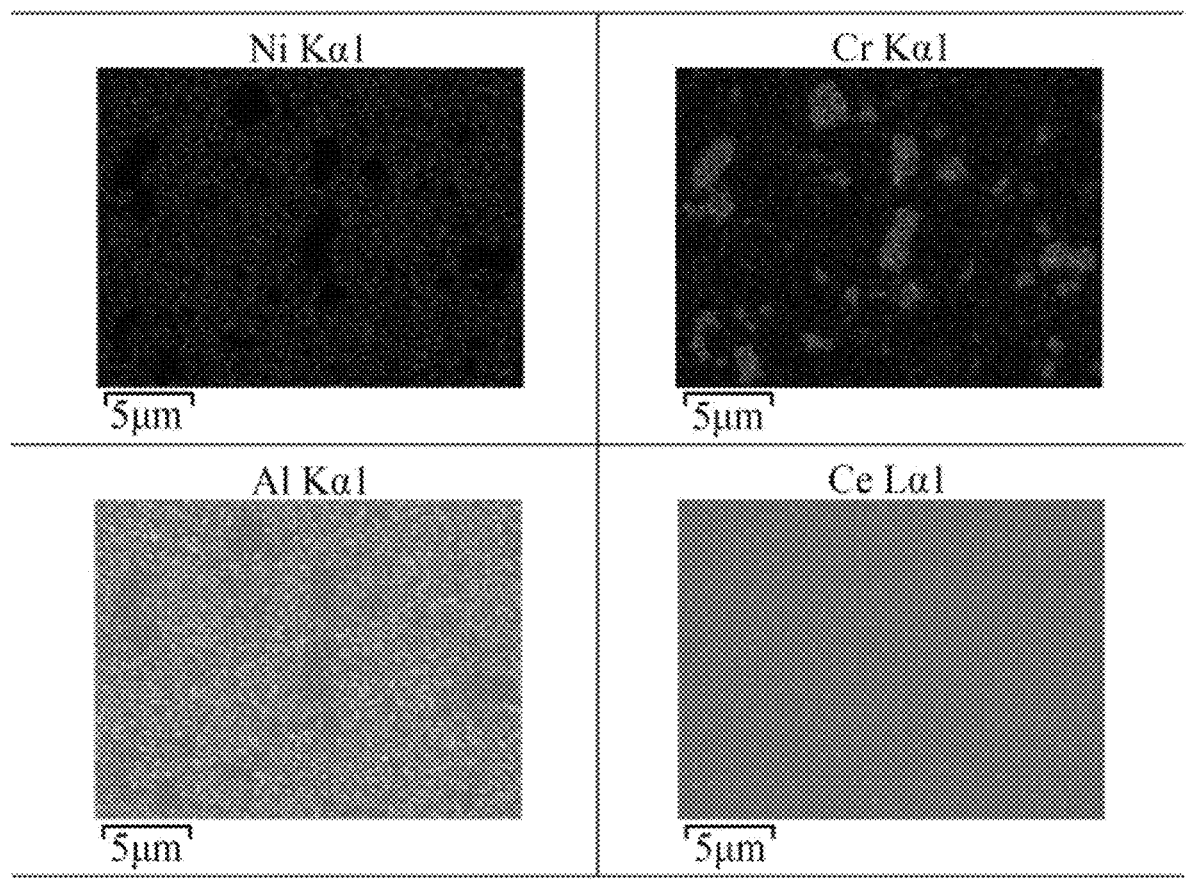
FIG. 9 shows 5,000× scanning images of the entire material of a valve face of an exhaust valve.
Figure 10:
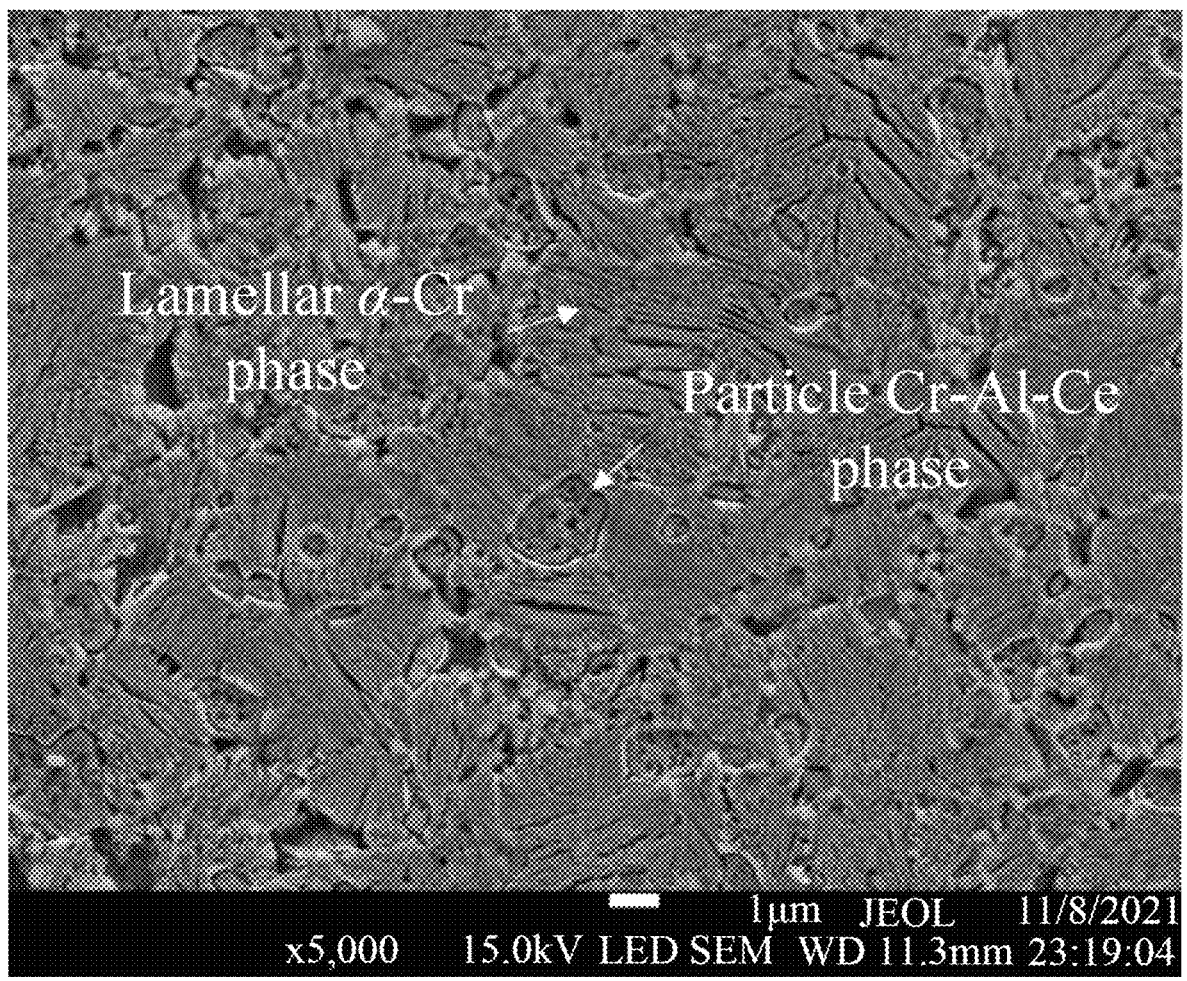
FIG. 10 is a 5,000× scanning image of a material of a rod portion of an exhaust valve.
Figure 11:
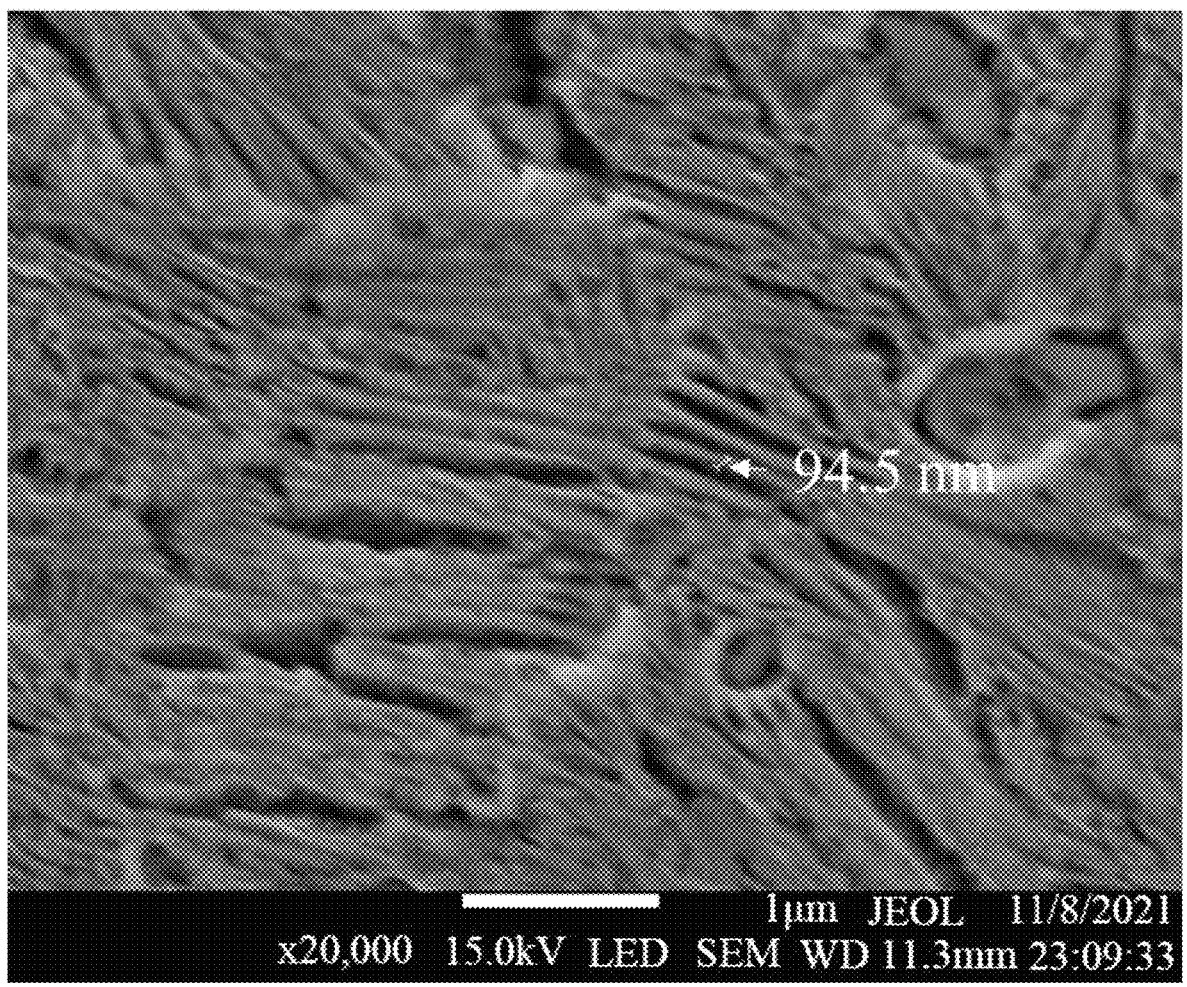
FIG. 11 shows a size of a α-Cr phase of a material of a rod portion of an exhaust valve measured at 20,000×.
Figure 12:
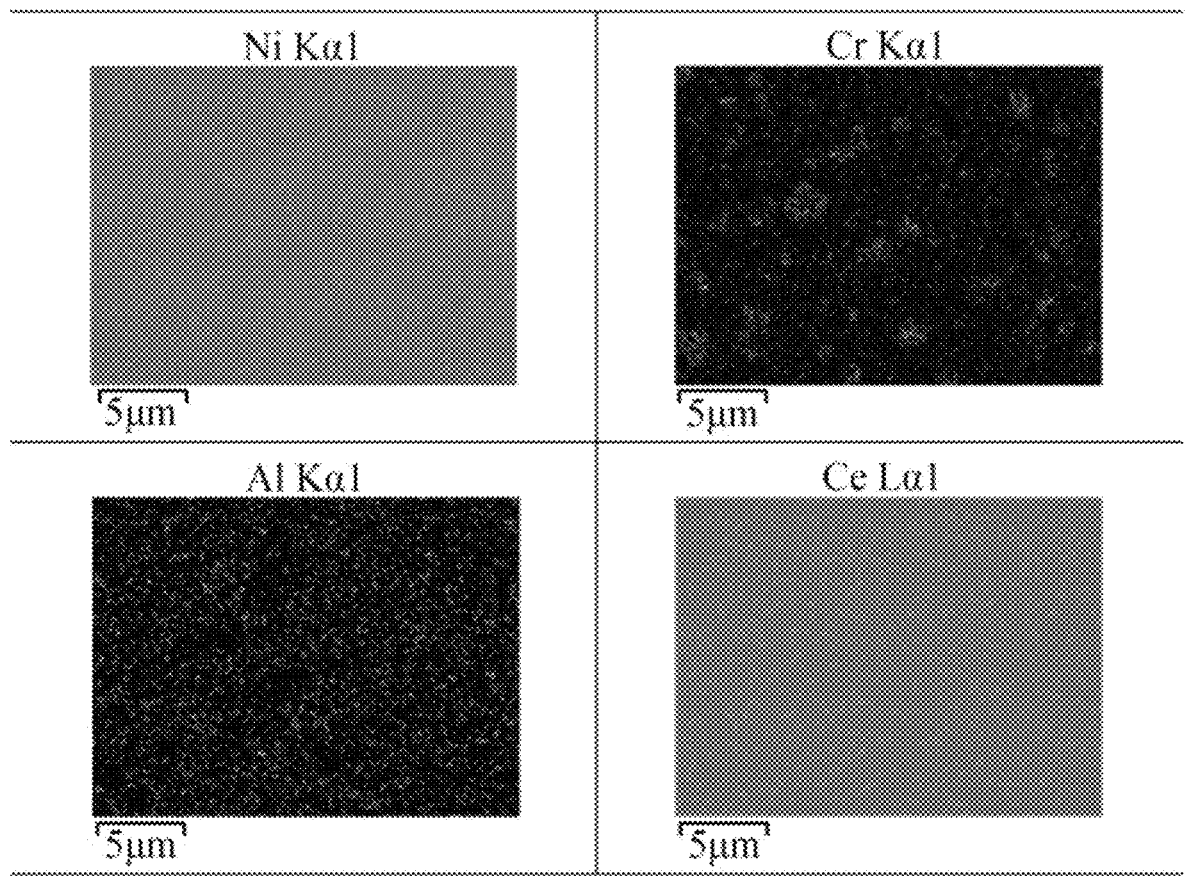
FIG. 12 shows 5,000× scanning images of the entire material of a rod portion of an exhaust valve.

The alloy bar raw material in Example 2 was manufactured into an exhaust valve through a series of operations (including two solution treatments and one aging treatment in the manufacturing method of the present disclosure). The solution treatment in the pretreatment was conducted at 1,000° C. for 50 min in combination with oil-cooling. The supplemental heating and heat preservation treatment was conducted at 1,000° C. for 20 min and at 1,020° C. for 25 min. The aging treatment in the post-treatment was conducted at 770° C. for 16 h in combination with air-cooling. Materials were collected from a valve face and a rod portion of an exhaust valve and subjected to scanning and energydispersive X-ray spectroscopy tests. A cut sample was electrolytically corroded with a 10% oxalic acid solution for 5 s and then observed under an FEI Nova400 field emission scanning electron microscope. Test results: FIG. 6 is a 20,000× scanning image of the material produced after a first solution treatment. It can be seen that, after the pretreatment-solution treatment, lamellar phases with a size of 145 nm and particle phases with a size of no more than 5 μm left in the material conform to the second phase characteristics after the first solution treatment, that is, a thickness of a single lamella of the α-Cr lamellar phase is 150 nm or less and a diameter of the nickel-lean Cr—Al—Ce particle phase is no more than 10 μm. FIG. 7 is a 5,000× scanning image of a material of the valve face. FIG. 8 shows a size of a α-Cr phase of the material of the valve face measured at 20,000×, and it can be seen that an average thickness of a single lamella of the α-Cr phase is 108.5 nm. FIG. 9 shows 5,000× scanning images of the entire material of the valve face, and it can be seen that the particle structure is rich in chromium and poor in nickel, while chromium and nickel are evenly distributed in the lamellar structure. FIG. 10 is a 5,000× scanning image of a material of a rod portion. FIG. 11 shows a size of a α-Cr phase of the material of the rod portion measured at 20,000×, and it can be seen that an average thickness of a single lamella of the α-Cr phase is 94.5 nm. FIG. 12 shows 5,000× scanning images of the entire material of the rod portion, and it can also be seen that the particle structure is rich in chromium and poor in nickel, while chromium and nickel are evenly distributed in the lamellar structure. The lamellar and particle structures are evenly distributed. The lamellar and particle structures work together for grain refinement.

Example 3

The 3J40 alloy for manufacturing an exhaust valve in Example 3 includes the following essential elements in mass percentages: Cr: 39.23%, Al: 3.35%, Fe: 0.26%, Ce: 0.15%, Si: 0.061%, Mn: 0.010%, S: 0.002%, P: 0.005%, C: 0.015%, and Ni: the balance.

The solution treatment before electric upsetting was conducted at 1,050° C. for 70 min in combination with oil-cooling. The rare earth element Ce is unique for the 3J40 alloy. After Ce is added to the alloy, Ce plays a role of grain refinement, fine spherical high-melting-point cerium oxide or cerium oxysulfide inclusions can be produced from Ce and undergo segregation instead of some large low-melting-point inclusions at grain boundaries, and the Ce inclusions at the grain boundaries provide heterogeneous nucleation cores to increase a nucleation rate, such that austenite grains are refined and grain boundaries increase. The α-Cr lamellar phases and the nickel-lean Cr—Al—Ce particle phases in the alloy undergo an incomplete solution, and fine lamellar precipitated phases and particle precipitated phases are distributed around grain boundaries and on a matrix, which blocks the grain growth caused by the migration of grain boundaries of static recrystallization during an aging process to allow the refinement of grains of the bar material. The grain refinement of the material can improve the tensile strength, impact resistance, and crack resistance of the bar material during hot working. During the thermal deformation of electric upsetting, microstructures are diffusely distributed, microstructures diffusely distributed in this way are conducive to the energy storage at grain boundaries, and thus the grain boundary energy can increase to increase a degree of dynamic recrystallization, thereby resulting in refined grains. The final grain size, lamellar phase, and particle phase after the electric upsetting still increase slightly compared with those before the electric upsetting, but the grain growth is still controlled to a large extent compared with that before optimization.

After the electric upsetting, a supplemental heating and heat preservation treatment was conducted at 1,050° C. for 25 min and at 1,050° C. for 20 min. In the present disclosure, a temperature of the heat preservation is controlled at 1,000° C. to 1,050° C., and a time of the heat preservation is controlled at 45 min or less; and the time of the heat preservation should not be too long. The lamellar and particle structures are refined. The static recrystallization occurs during the supplemental heating and heat preservation process, such that the coarse grains caused by long-term material accumulation for electric upsetting can be further refined and a bar material obtained after electric upsetting has a uniform temperature and uniform grains. During the die forging process, the fine lamellar phase and particle phase produced after the supplemental heating and heat preservation hinder the grain boundary sliding and allow the energy storage to promote the dynamic recrystallization for nucleation, and inhibit the growth of grains.

After the die forging, an aging treatment was conducted at 790° C. for 18 h in combination with air-cooling. The static recrystallization occurs during the aging treatment process. Because fine α-Cr lamellar phases with a size of 140 nm or less and nickel-lean Cr—Al—Ce particle phases are precipitated at austenite grain boundaries, phases undissolved before the aging treatment and phases newly formed after the aging treatment are homogenized due to the aging treatment, such that a microstructure in which both strengthening phases and grains are ultra-fine is formed to block the grain growth caused by the migration of grain boundaries of static recrystallization, thereby playing a grain refinement role.

Figure 13:
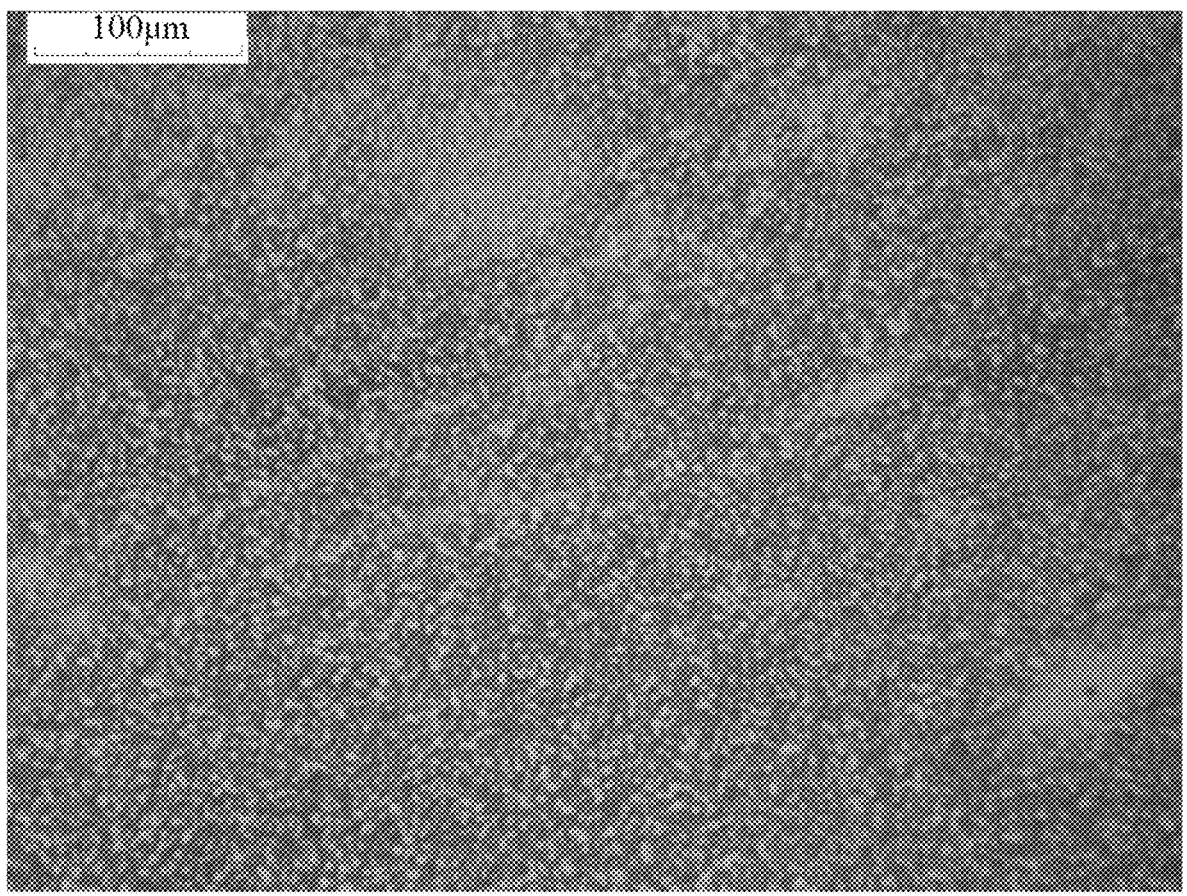
FIG. 13 is an image illustrating grains of a disc portion of a 3J40 alloy exhaust valve observed under a metallographic microscope and a scanning electron microscope.
Figure 14:
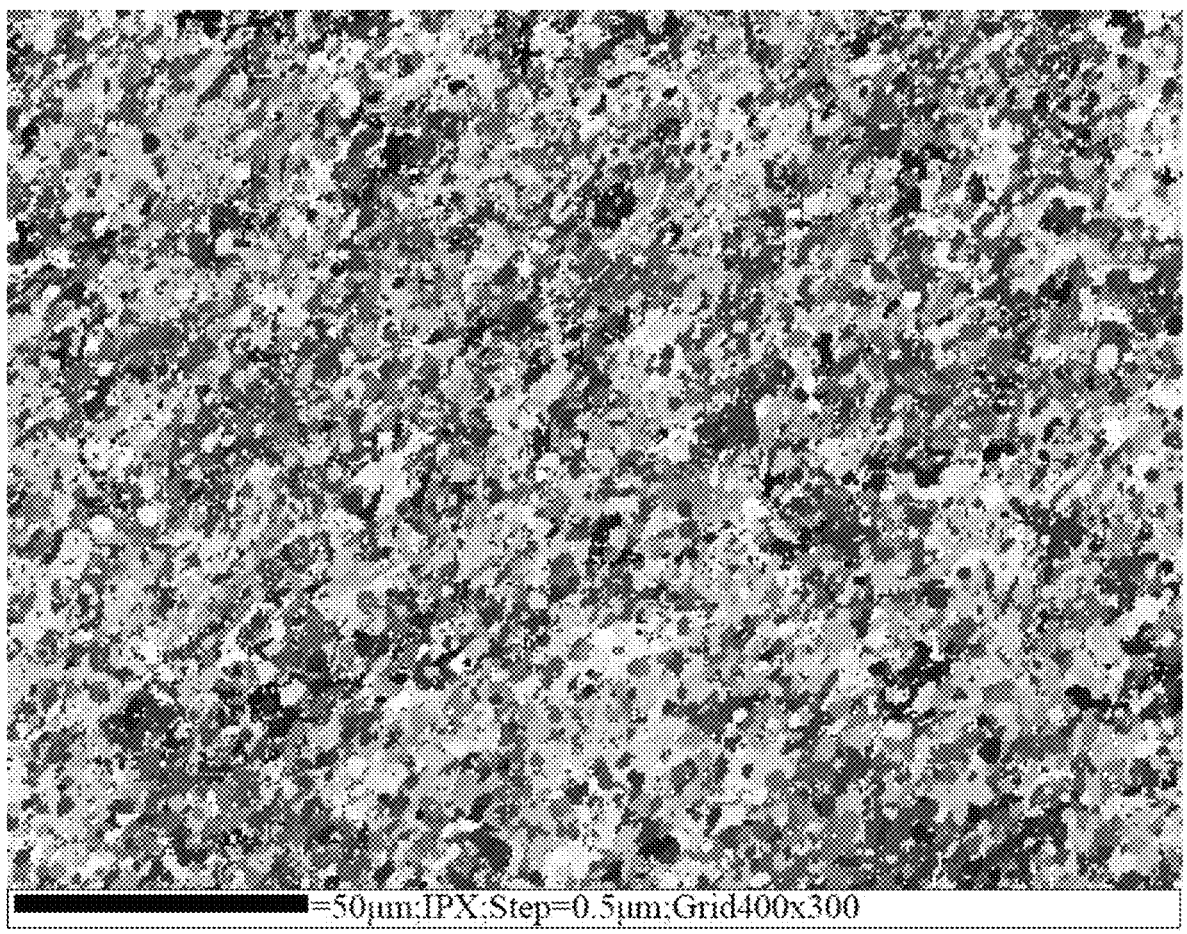
FIG. 14 is an image illustrating grains of a rod portion of a 3J40 alloy exhaust valve observed under a metallographic microscope and a scanning electron microscope.
Figure 15:
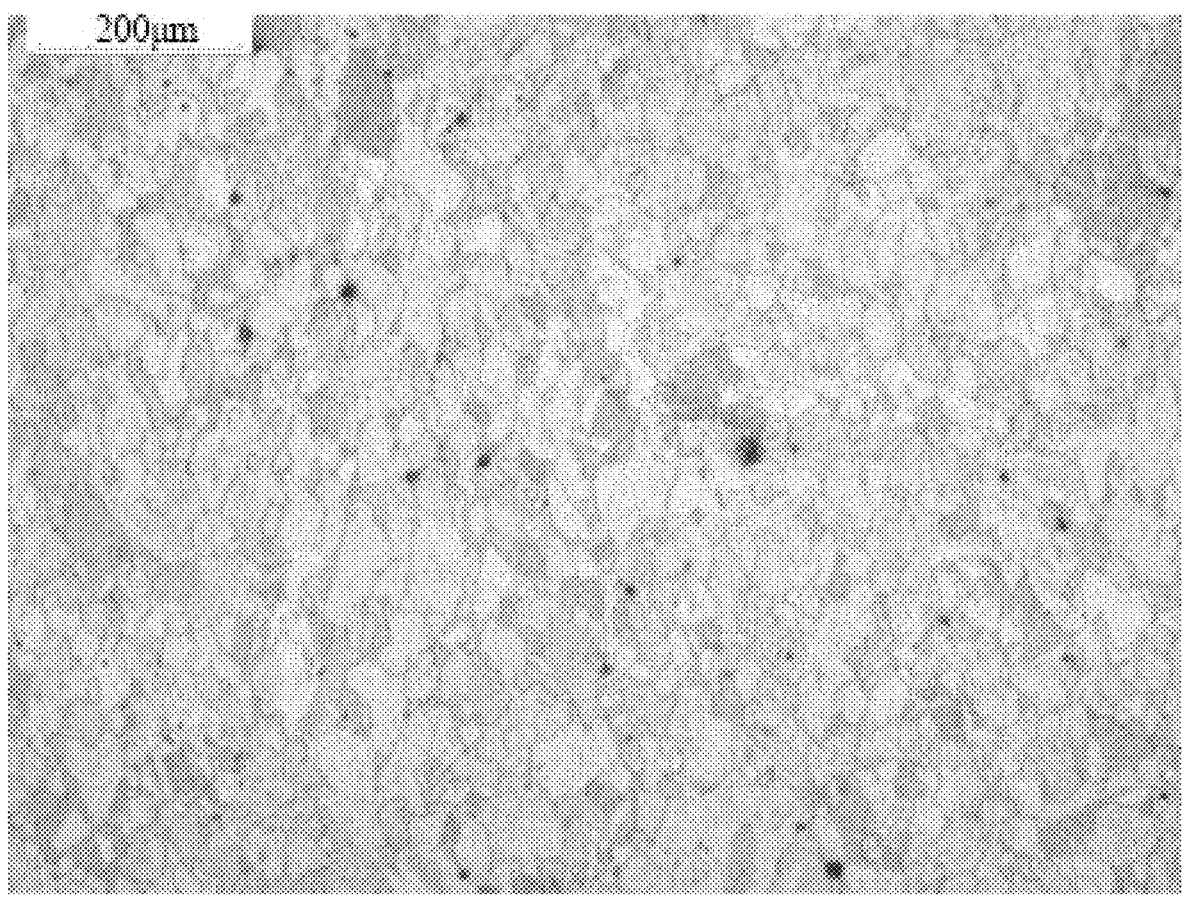
FIG. 15 is an image illustrating grains of a disc portion of a Nimonic80A alloy exhaust valve observed under a metallographic microscope.

As shown in FIG. 13 and FIG. 14, grain sizes of disc and rod portions of the 3J40 alloy exhaust valve are observed under a metallographic microscope and a scanning electron microscope. The overall grain size of the 3J40 alloy exhaust valve is at 10 grade, and grains of the 3J40 alloy exhaust valve are well refined. A Nimonic80A alloy exhaust valve was manufactured with the same billet specification and manufacturing method. FIG. 15 is an image illustrating grains of a disc portion of the Nimonic80A alloy exhaust valve observed under a metallographic microscope. The overall grain size of the Nimonic80A alloy exhaust valve is at grade 6, a local grain size reaches grade 9, and grains of the Nimonic80A alloy exhaust valve are unevenly distributed, which is not conducive to the improvement of performance of the exhaust valve.

The above series of treatments for the 3J40 alloy solve the problem of grain coarsening in a hot forming process, and improve the corrosion resistance, strength and toughness, impact resistance, and vibration-damping performance of the alloy, such that the 3J40 alloy can be used for manufacturing an exhaust valve.

The above are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:
1. A large-size diesel exhaust valve, comprising an exhaust valve disc portion made of a 3J40 alloy, wherein the large-size diesel exhaust valve has the following microstruc- ture: there are ultra-fine grains with a grain size of 10 grade or more, α-Cr lamellar phases are evenly distributed at grain boundaries of the ultra-fine grains, nickel-lean Cr—Al—Ce particle phases are evenly distributed in a matrix, a single lamella of the α-Cr lamellar phases has a thickness of less than 140 nm, and the nickel-lean Cr—Al—Ce particle phases have a diameter of no more than 10 μm.

2. The large-size diesel exhaust valve according to claim 1, wherein 3J40 alloy comprises the following essential elements in mass percentages: Cr: 39% to 41%, Al: 3.3% to 3.5%, Fe: less than or equal to 0.5%, Ce: 0.1% to 0.2%, Si: less than or equal to 0.2%, Mn: less than or equal to 0.10%, S: less than or equal to 0.010%, P: less than or equal to 0.010%, C: less than or equal to 0.03%, and Ni: the balance.

3. The large-size diesel exhaust valve according to claim 1, wherein 3J40 alloy comprises the following essential elements in mass percentages: Cr: 39.2%, Al: 3.32%, Fe: 0.12%, Ce: 0.2%, Si: 0.03%, Mn: 0.10%, S: 0.010%, P: 0.0033%, C: 0.018%, and Ni: the balance.

4. The large-size diesel exhaust valve according to claim 1, wherein 3J40 alloy comprises the following essential elements in mass percentages: Cr: 39.56%, Al: 3.39%, Fe: 0.14%, Ce: 0.12%, Si: 0.061%, Mn: 0.010%, S: 0.003%, P: 0.006%, C: 0.022%, and Ni: the balance.

5. The large-size diesel exhaust valve according to claim 1, comprising the following essential elements in mass percentages: Cr: 39.23%, Al: 3.35%, Fe: 0.26%, Ce: 0.15%, Si: 0.061%, Mn: 0.010%, S: 0.002%, P: 0.005%, C: 0.015%, and Ni: the balance.

6. A manufacturing method of a large-size diesel exhaust valve, comprising the following steps:
pretreatment: subjecting a 3J40 alloy bar to a solution treatment at 1,000° C. to 1,050° C. for 50 min to 70 min to obtain a first intermediate material, and oil-cooling the first intermediate material to obtain a second intermediate material, wherein a thickness of a single lamella of a α-Cr lamellar phase is controlled at less than 150 nm and a diameter of a nickel-lean Cr—Al—Ce particle phase is controlled at no more than 10 μm;
electric upsetting process: forming the second intermediate material through electric upsetting at a low strain rate to obtain a first billet, wherein throughout the electric upsetting process, an electric upsetting temperature is controlled at 1,150° C. to 950° C. and an electric upsetting strain rate is controlled at 0 $s^{-1}$ to 0.05 $s^{-1}$;
supplemental heating treatment: conducting supplemental heating on a head of the first billet at 1,000° C. to 1,050° C. for 20 min to 25 min to obtain a second billet;
heat preservation treatment: holding the second billet at 1,000° C. to 1,050° C. for 20 min to 25 min to obtain a third billet, wherein a total time of a supplemental heating time and a heat preservation time is 45 min or less;
die forging process: forging the third billet at one time to produce a first initial exhaust valve with a disc portion and a rod portion; and
post-treatment: subjecting the first initial exhaust valve to an aging treatment at 770° C. to 790° C. for 16 h to 18 h to obtain a second initial exhaust valve, and air-cooling the second initial exhaust valve,
wherein the thickness of the single lamella of the α-Cr lamellar phase is controlled at less than 140 nm and the diameter of the nickel-lean Cr—Al—Ce particle phase is controlled at no more than 10 μm.

7. The manufacturing method of a large-size diesel exhaust valve according to claim 6, wherein aging treatment is conducted at 780° C.

8. The manufacturing method of a large-size diesel exhaust valve according to claim 6, wherein the solution treatment in pretreatment is conducted at 1,020° C. for 60 min.

9. The manufacturing method of a large-size diesel exhaust valve according to claim 6, wherein supplemental heating treatment is conducted at 1,020° C. for 20 min; and heat preservation treatment is conducted at 1,050° C. for 25 min.

* * * * *